US012675126B2

(12) United States Patent
Ohara

(10) Patent No.: US 12,675,126 B2
(45) Date of Patent: Jul. 7, 2026

(54) OPERATION MECHANISM AND INPUT DEVICE

(71) Applicant: ALPS ALPINE CO., LTD., Tokyo (JP)

(72) Inventor: Hiroshi Ohara, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 225 days.

(21) Appl. No.: 18/545,242

(22) Filed: Dec. 19, 2023

(65) Prior Publication Data

US 2024/0255979 A1 Aug. 1, 2024

(30) Foreign Application Priority Data

Jan. 31, 2023 (JP) ................................ 2023-013148

(51) Int. Cl.

*G05G 1/02* (2006.01)
*G05G 5/05* (2006.01)
*H01F 7/02* (2006.01)
*H01F 7/06* (2006.01)

(52) U.S. Cl.

CPC ................ *G05G 1/02* (2013.01); *G05G 5/05* (2013.01); *H01F 7/02* (2013.01); *H01F 7/06* (2013.01); *G05G 2505/00* (2013.01)

(58) Field of Classification Search

None

See application file for complete search history.

(56) References Cited

U.S. PATENT DOCUMENTS 4,296,394 A * 10/1981 Ragheb .................... H01H 5/02 335/206
8,773,226 B2 * 7/2014 Li ...................... H01H 51/2272 335/136
2009/0201110 A1 8/2009 Yamada et al.

FOREIGN PATENT DOCUMENTS

JP 2009-193699 8/2009

* cited by examiner

*Primary Examiner* — Bernard Rojas
(74) *Attorney, Agent, or Firm* — IPUSA, PLLC

(57) ABSTRACT

An operation mechanism includes a magnet; a first movable plate formed of a magnetic material and connected to one pole of the magnet; and a second movable plate formed of a magnetic material and connected to another pole of the magnet, wherein, while the first movable plate is not being operated, the second movable plate is at a return position that overlaps the first movable plate, and wherein, while the first movable plate is being operated, the first movable plate pushes down a middle portion of the second movable plate, such that the middle portion of the second movable plate remains in contact with the first movable plate and the second movable plate is tilted, so as to cause a free end of the second movable plate to be separated from the first movable plate.

6 Claims, 13 Drawing Sheets

100-3

100-3

OPERATION MECHANISM AND INPUT DEVICE

CROSS-REFERENCE TO RELATED APPLICATIONS

The present application is based upon and claims priority under 35 U.S.C. § 119 to Japanese Patent Application No. 2023-013148 filed on Jan. 31, 2023, the entire contents of which are incorporated herein by reference.

BACKGROUND OF THE INVENTION

1. Field of the Invention

The present disclosure relates to an operation mechanism and an input device.

2. Description of the Related Art

There is a document (e.g., Japanese Laid-Open Patent Application No. 2009-193699 (hereafter, Patent Document 1)) that relates to a stop lamp switch for vehicles, and discloses a technique for lighting a stop lamp of a vehicle, in which the attractive force of a magnet to an armature is gradually weakened when a moving element moves with a depressing operation of the brake pedal of the vehicle, and when the restoring force from an elastic deformation state of a movable contact spring becomes stronger than the attractive force of the magnet to the armature, by restoring of the movable contact spring, the movable contact is separated from a fixed contact to light the stop lamp of the vehicle.

However, the technique of Patent Document 1 needs to provide a spring for reliably causing the moving element to return (i.e., a return mechanism), and has problems to be solved such as an increase in the number of parts and an increase in the size of the entire device. In addition, the technique of Patent Document 1 also has room for improvement in obtaining a good operating feeling.

SUMMARY OF THE INVENTION

According to an embodiment in the present disclosure, an operation mechanism includes a magnet; a first movable plate formed of a magnetic material and connected to one pole of the magnet; and a second movable plate formed of a magnetic material and connected to another pole of the magnet, wherein, while the first movable plate is not being operated, the second movable plate is at a return position that overlaps the first movable plate, and wherein, while the first movable plate is being operated, the first movable plate pushes down a middle portion of the second movable plate, such that the middle portion of the second movable plate remains in contact with the first movable plate and the second movable plate is tilted, so as to cause a free end of the second movable plate to be separated from the first movable plate.

DESCRIPTION OF THE PREFERRED EMBODIMENTS

Figure 1:
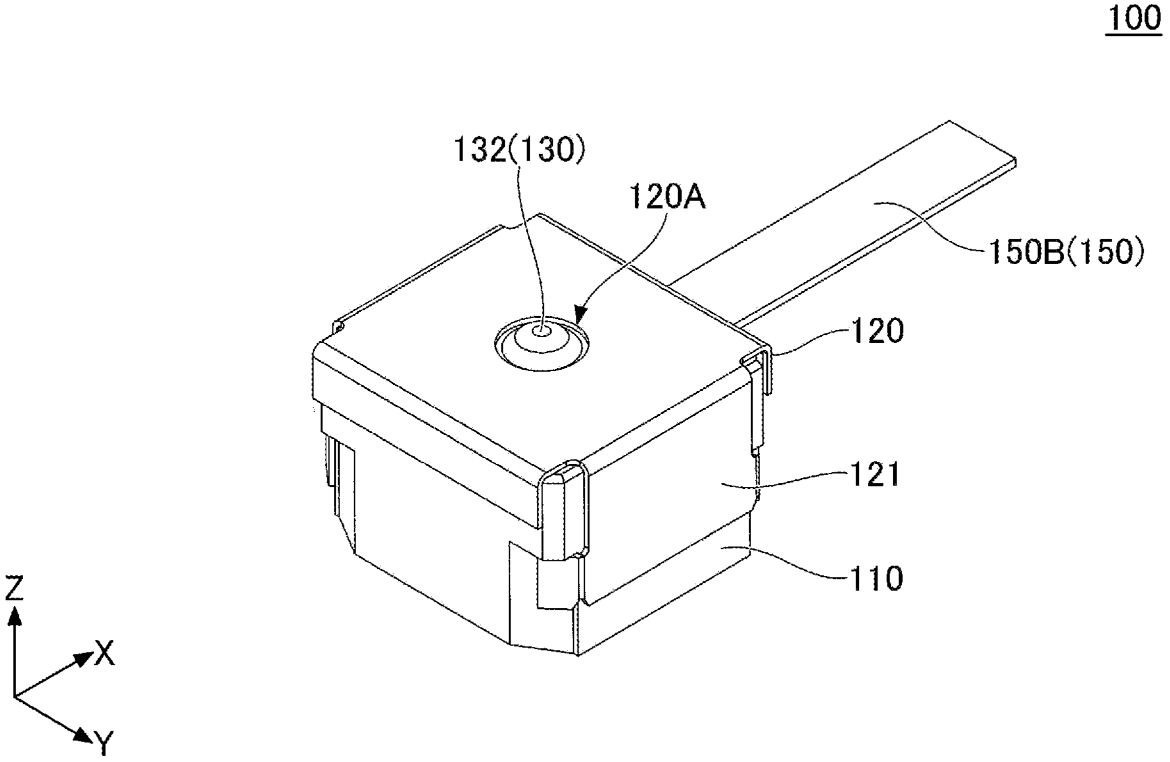
FIG. 1 is an external perspective view of an input device according to one embodiment.

In the following, with reference to the drawings, one embodiment will be described. According to an operation mechanism according to the one embodiment, a good pressing operation feeling and a reliable recovery force can be obtained without providing a recovery mechanism.

Note that, in the following description, for the sake of convenience, the Z-axis direction in the drawings is defined as the up-down direction, the Y-axis direction in the drawings is defined as the left-right direction, and the X-axis direction in the drawings is defined as the front-back direction, where the Z-axis positive direction is defined as the upward direction, the Y-axis positive direction is defined as the rightward direction, and the X-axis positive direction is defined as the forward direction.

(Overview of Input Device 100)

FIG. 1 is an external perspective view of an input device 100 according to one embodiment. As illustrated in FIG. 1, the input device 100 generally has a generally rectangular parallelepiped shape.

As illustrated in FIG. 1, the input device 100 has a housing 110 whose upper surface is covered by a frame 120. A circular opening 120A is formed in a center portion of the frame 120. An operation portion 132 of a first movable plate 130 provided inside the housing 110 is provided to be exposed in the opening 120A.

In the input device 100, a downward (in the Z-axis negative direction) pressing operation can be performed on the operation portion 132 of the first movable plate 130, and by the pressing operation, a switch-off state can be switched to a switch-on state.

(Configuration of Input Device 100)

Figure 2:
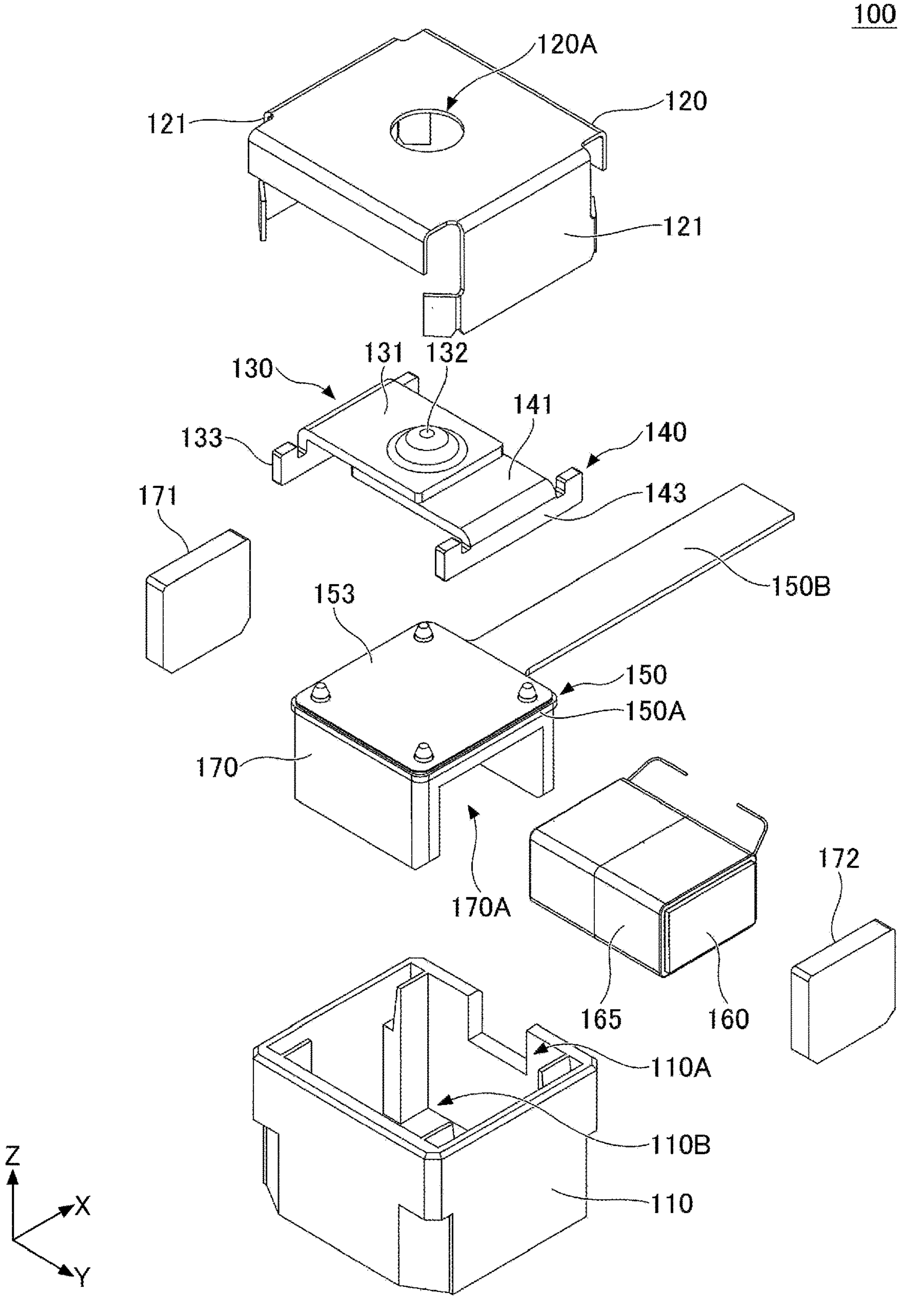
FIG. 2 is an exploded perspective view of the input device according to the one embodiment.
Figure 3:
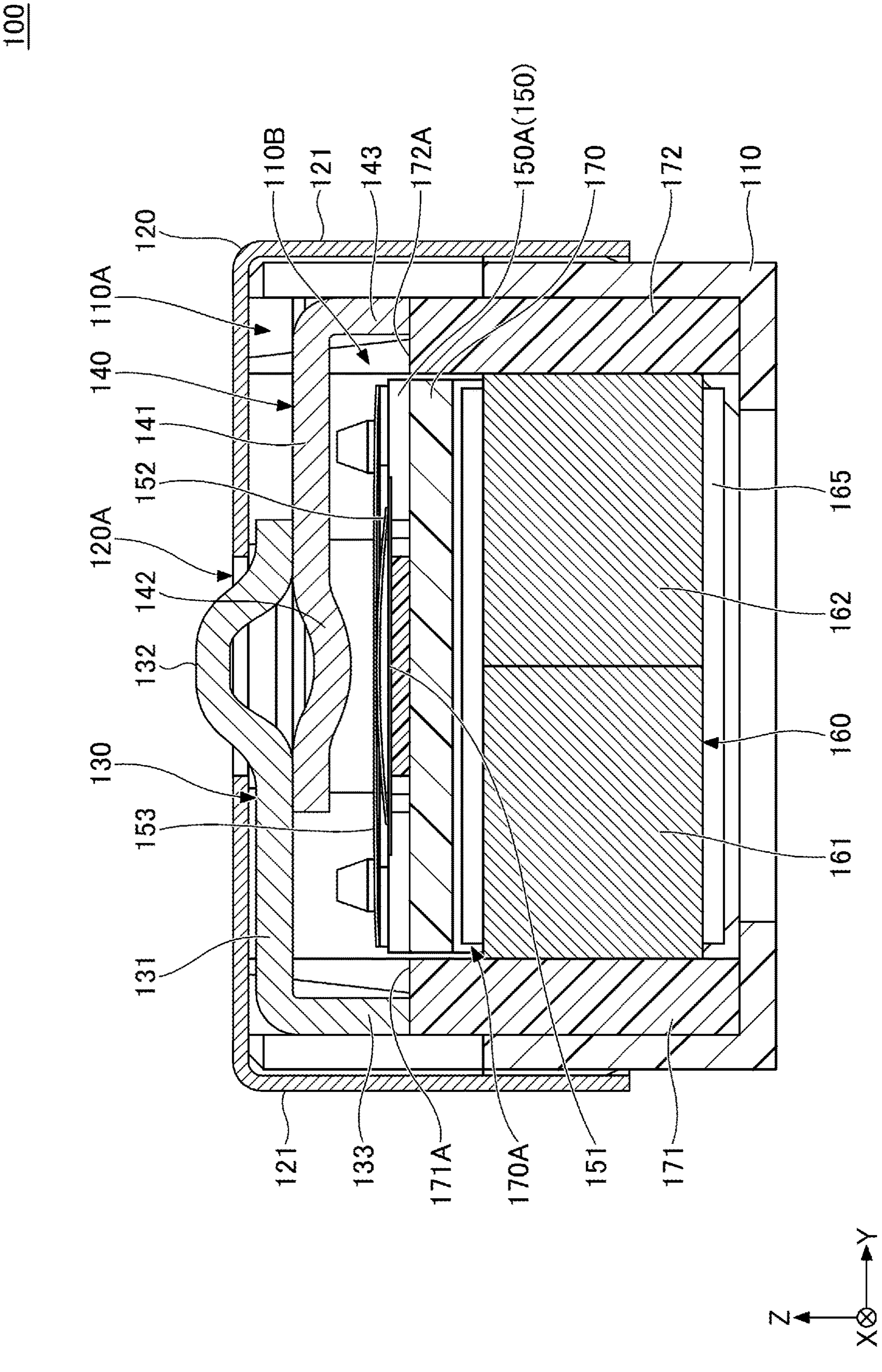
FIG. 3 is a cross-sectional view of the input device according to the one embodiment while not being operated.

FIG. 2 is an exploded perspective view of the input device 100 according to the one embodiment. FIG. 3 is a cross-sectional view of the input device 100 according to the one embodiment while not being operated. As illustrated in FIGS. 2 and 3, the input device 100 includes the housing 110, the frame 120, the first movable plate 130, a second movable plate 140, an FPC 150, a magnet 160, a coil 165, a base member 170, a first yoke 171, and a second yoke 172.

The first movable plate 130, the second movable plate 140, the magnet 160, the coil 165, the first yoke 171, and the second yoke 172 constitute an "operation mechanism".

The housing 110 is a container-shaped member having a generally rectangular parallelepiped shape. The housing 110 has an upper opening 110A in the upper surface, and has an internal space 110B having a shape recessed downward from the upper opening 110A. For example, the housing 110 is formed by using a relatively hard insulating material (such as a hard resin).

The frame 120 is a flat plate member made of a metal. The frame 120 is attached to be fixed to the upper surface of the housing 110, to block the upper opening 110A of the housing 110. In top view, the circular opening 120A for projecting the operation portion 132 of the first movable plate 130 upward is formed in a center portion of the frame 120. In addition, each of the right and left ends of the frame 120 is provided with a hook 121 hanging downward formed by bending the frame 120. The frame 120 is fixed to the housing 110 by having the pair of right and left hooks 121 engaged with the side surfaces of the housing 110.

The first movable plate 130 is provided in the internal space 110B of the housing 110, and on the lower side (the Z-axis negative side) of the frame 120, to be extending from the left end (an end on the Y-axis negative side) toward a center portion of the internal space 110B of the housing 110.

The first movable plate 130 includes a base portion 131, the operation portion 132, and a leg portion 133. The first movable plate 130 is formed by machining one metal plate (an example of a "magnetic material") such as an SPCC steel plate, so as to integrally form the base portion 131, the operation portion 132, and the leg portion 133.

The base portion 131 is a flat plate portion extending in the left-right direction (in the Y-axis direction) from the left end (an end on the Y-axis negative side) toward a center portion of the internal space 110B of the housing 110. As illustrated in FIG. 3, the base portion 131 takes a horizontal position while the operation portion 132 of the first movable plate 130 is not being operated.

The operation portion 132 is provided on a free end side (an end on the Y-axis positive side) of the base portion 131, and has an upward convex shape (in the Z-axis positive direction). The operation portion 132 is provided through the opening 120A of the frame 120, and is exposed upward relative to the opening 120A. The operation portion 132 is a portion on which a pressing operation is performed by an operator.

The leg portion 133 is a wall-shaped portion extending downward (in the Z-axis negative direction) from a terminal end (an end on the Y-axis negative side) of the base portion 131. The leg portion 133 is provided in contact with the upper surface 171A of the first yoke 171 arranged in the internal space 110B of the housing 110, to support the terminal end of the base portion 131 so as to cause the base portion 131 to take a horizontal position. As illustrated in FIG. 3, the leg portion 133 takes a vertical position while the operation portion 132 of the first movable plate 130 is not being operated. The first movable plate 130 is provided to be tiltable with the leg portion 133 (terminal end) as the fulcrum.

The first movable plate 130 is magnetically connected to one pole 161 of the magnet 160 through the first yoke 171. Accordingly, the first movable plate 130 is magnetized with the same polarity as the one pole 161 of the magnet 160.

The second movable plate 140 is provided in the internal space 110B of the housing 110, and on the lower side (the Z-axis negative side) of the first movable plate 130, extending from the right end (an end on Y-axis positive side) toward a center portion of the internal space 110B of the housing 110.

The second movable plate 140 includes a base portion 141, a pressing portion 142, and a leg portion 143. The second movable plate 140 is formed by machining one metal plate (an example of a "magnetic material") such as an SPCC steel plate, so as to integrally form the base portion 141, the pressing portion 142, and the leg portion 143.

The base portion 141 is a flat plate portion extending in the left-right direction (in the Y-axis direction) from the right end (an end on the Y-axis positive side) toward a center portion of the internal space 110B of the housing 110. As illustrated in FIG. 3, the base portion 141 takes a horizontal position while the operation portion 132 of the first movable plate 130 is not being operated.

The pressing portion 142 is provided on a free end side (an end on the Y-axis negative side) of the base portion 141, and has a downward (in the Z-axis negative direction) convex shape. The pressing portion 142 is provided below the operation portion 132 of the first movable plate 130 and above a movable contact member 152 provided in the FPC 150. The pressing portion 142 is a portion to press a top portion of the movable contact member 152 provided in the FPC 150 while the operation portion 132 of the first movable plate 130 is being operated. Note that, in order to adjust the operation feeling by optimizing the contact with the movable contact member 152, the pressing portion 142 can be formed by deflecting the base portion 141 to allow magnetic attraction with the first movable plate 130, or can be formed in a corrugated shape, V-shape, or the like.

The leg portion 143 is a wall-shaped portion extending downward (in the Z-axis negative direction) from a terminal end (an end on the Y-axis positive side) of the base portion 141. The leg portion 143 is provided in contact with the upper surface 172A of the second yoke 172 arranged in the internal space 110B of the housing 110, to support the terminal end of the base portion 141 so as to cause the base portion 141 to take a horizontal position. As illustrated in FIG. 3, the leg portion 143 takes a vertical position while the operation portion 132 of the first movable plate 130 is not being operated. The second movable plate 140 is provided to be tiltable with the leg portion 143 (terminal end) as the fulcrum.

The second movable plate 140 is magnetically connected to the other pole 162 of the magnet 160 through the second yoke 172. Accordingly, the second movable plate 140 is magnetized with the same polarity as the other pole 162 of the magnet 160.

The FPC 150 is a film-shaped wiring member. The FPC 150 includes a base portion 150A that is arranged in the internal space 110B of the housing 110, and fixed to the upper surface of the base member 170. A fixed contact 151 made of a conductor is provided at a center portion in the upper surface of the base portion 150A, above which the dome-shaped movable contact member 152 made of a conductor is further provided. In addition, the FPC 150 includes a band-shaped drawer part 150B that is drawn out of the base portion 150A toward the outside of the housing

110. Further, the upper surface of the FPC 150 is affixed with a resin film 153, i.e., covered with the resin film 153.

The fixed contact 151 and the movable contact member 152 constitute an example of an "input mechanism", and constitute what-is-called a switch. Note that the "input mechanism" may have any configuration as long as being capable of detecting at least an input that is switched by tilting of the second movable plate 140. For example, the "input mechanism" may be a variable resistor having a slider that slides on a resistor pattern when the second movable plate 140 is tilted, or a non-contact switch (a magnetic sensor to detect change in magnetic force from a magnet or coil caused by tilting of the second movable plate 140, an optical sensor to detect change in amount of received light reaching a light receiving part, an electrostatic sensor to detect change in electrostatic capacity, etc.).

The base member 170 is provided on the lower side (the Z-axis negative side) of the internal space 110B of the housing 110. The base member 170 is a block-shaped member having a rectangular parallelepiped shape. In the base member 170, a groove portion 170A that has a rectangular shape in cross section and an open lower side (the Z-axis negative side) is formed extending in the left-right direction (in the Y-axis direction). The magnet 160 and the coil 165 are arranged in the groove portion 170A. In addition, the base portion 150A of the FPC 150 is fixed to the upper surface of the base member 170.

The magnet 160 is provided in the groove portion 170A of the base member 170. The magnet 160 is a square rod-shaped member extending in the left-right direction (in the Y-axis direction). A half on the left side (the Y-axis negative side) of the magnet 160 is magnetized to the one pole 161. A half on the right side (the Y-axis positive side) of the magnet 160 is magnetized to the other pole 162.

The coil 165 is wound around the axis of the Y-axis on the outer surfaces (the upper surface, lower surface, front surface, and back surface) of the magnet 160 in the groove portion 170A of the base member 170. The coil 165 is formed by using a lead wire. Both ends of the lead wire forming the coil 165 are connected to the FPC 150. The coil 165 can adjust the magnetic force of the magnet 160 according to the amount of current supplied through the FPC 150.

The first yoke 171 is a vertical wall-shaped member provided on the left side (the Y-axis negative side) of the magnet 160. The first yoke 171 is formed by using a magnetic material, and is provided in close contact with an end face on the left side (the Y-axis negative side) of the magnet 160. Accordingly, the first yoke 171 is magnetically connected to the one pole 161 of the magnet 160.

The second yoke 172 is a vertical wall-shaped member provided on the right side (the Y-axis positive side) of the magnet 160. The second yoke 172 is formed by using a magnetic material, and is provided in close contact with an end face on the right side (the Y-axis positive side) of the magnet 160. Accordingly, the second yoke 172 is magnetically connected to the other pole 162 of the magnet 160.

(Operations of Input Device 100)

Figure 4:
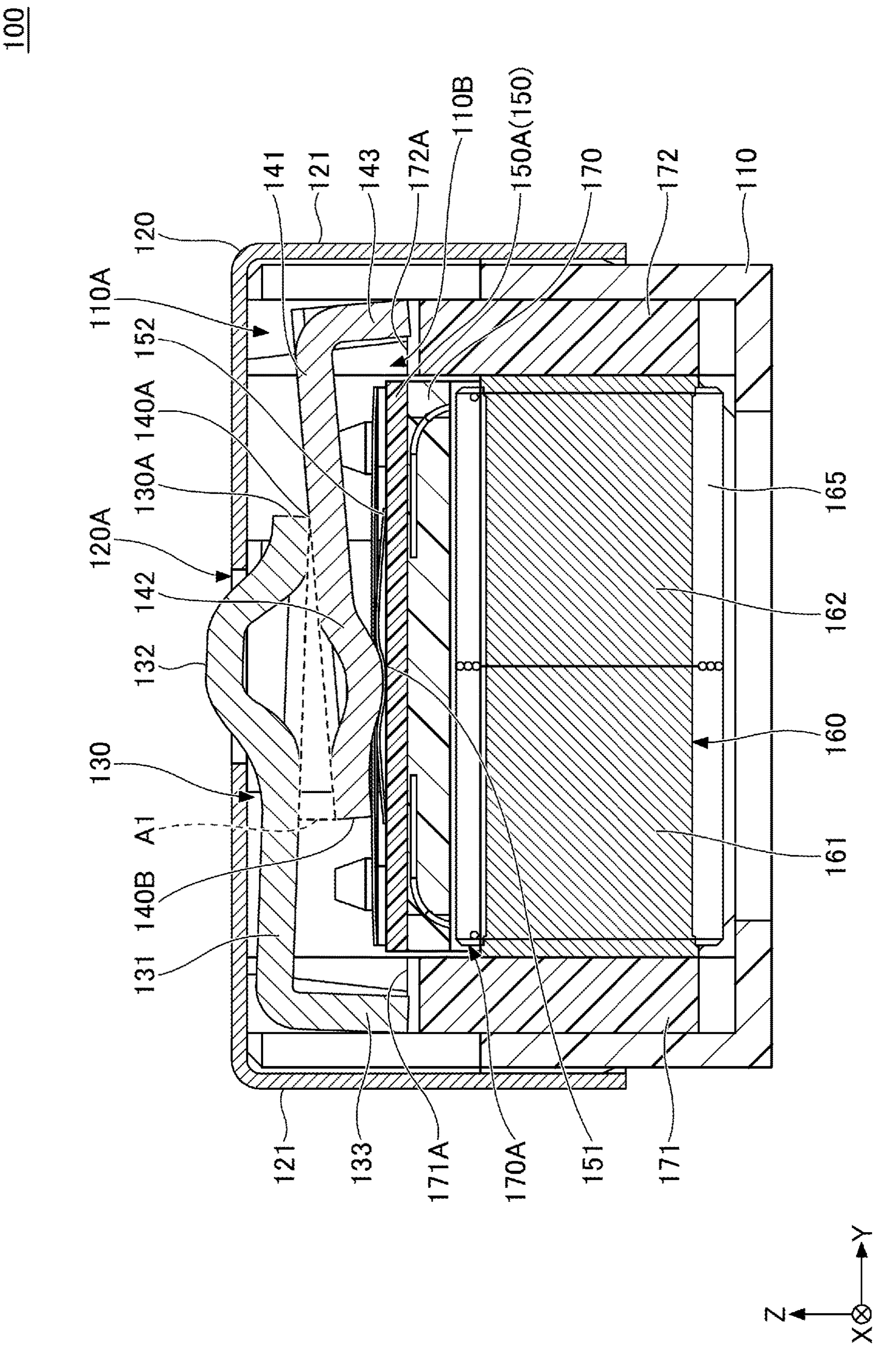
FIG. 4 is a cross-sectional view of the input device according to the one embodiment while being operated.

Next, with reference to FIGS. 3 and 4, operations of the input device 100 will be described. FIG. 4 is a cross-sectional view of the input device 100 according to the one embodiment while being operated.

As illustrated in FIG. 3, in the input device 100 according to the one embodiment, when no pressing operation is performed on the operation portion 132 of the first movable plate 130, both the first movable plate 130 and the second movable plate 140 are in a horizontal state. At this time, a portion on the free end 130A side of the first movable plate 130 and a portion on the free end 140B side of the second movable plate 140 overlap each other. In addition, the second movable plate 140 is at a return position overlapping the first movable plate 130. In addition, the pressing portion 142 of the second movable plate 140 is separated from the movable contact member 152 provided in the base portion 150A of the FPC 150, i.e., is not pressing the movable contact member 152. Therefore, the movable contact member 152 is not connected to the fixed contact 151 provided in the base portion 150A of the FPC 150, and hence, the input device 100 is in the switch-off state.

In addition, at this time, the portion on the free end 130A side of the first movable plate 130 and the portion on the free end 140B side of the second movable plate 140 are attracted to each other by the magnetic force of the first movable plate 130 (a magnetic force having the same polarity as the one pole 161 of the magnet 160) and the magnetic force of the second movable plate 140 (a magnetic force having the same polarity as the other pole 162 of the magnet 160) in a state of overlapping each other.

Then, as illustrated in FIG. 4, in the input device 100 according to the one embodiment, when a pressing operation is performed on the operation portion 132 of the first movable plate 130, by the first movable plate 130 tilting downward to the right, the free end 130A of the first movable plate 130 depresses a middle portion 140A of the second movable plate 140. Accordingly, the second movable plate 140 tilts downward to the left so as to make the free end 140B separated from the first movable plate 130 while the middle portion 140A remains in contact with the first movable plate 130.

As a result, the pressing portion 142 of the second movable plate 140 presses the top portion of the movable contact member 152. Then, the movable contact member 152 elastically deforms, and a portion on the reverse side of the top portion of the movable contact member 152 is connected to the fixed contact 151. Thus, the input device 100 switches to the switch-on state.

At this time, in the input device 100 according to the one embodiment, when a pressing operation is performed on the operation portion 132 of the first movable plate 130, the portion on the free end 140B side of the second movable plate 140 is pulled off from the portion on the free end 130A side of the first movable plate 130 against the magnetic attractive force, by which the operation load of the pressing operation on the operation portion 132 of the first movable plate 130 turns from increasing to decreasing, and thus, a click feeling can be presented for the pressing operation on the operation portion 132.

In addition, at this time, as illustrated in FIG. 4, a triangle-shaped area A1 is formed between the portion on the free end 130A side of the first movable plate 130 and the portion on the free end 140B side of the second movable plate 140 as viewed in the X-axis direction. Then, in this area A1, an attractive force is generated by the magnetic first movable plate 130.

In the input device 100 according to the one embodiment, when the pressing operation on the operation portion 132 of the first movable plate 130 is released by the attractive force in this area A1, while the second movable plate 140 is attracted to the first movable plate 130, each of the first movable plate 130 and the second movable plate 140 returns to the horizontal state, and the first movable plate 130 and the second movable plate 140 return to the state overlapping each other illustrated in FIG. 3.

As a result, the pressing on the movable contact member 152 by the pressing portion 142 of the second movable plate 140 is released, thereby, the connection of the movable contact member 152 to the fixed contact 151 is released, and the input device 100 according to the one embodiment returns to the switch-off state.

In particular, in the input device 100 according to the one embodiment, the free end 130A of the first movable plate 130 is always in contact with the middle portion 140A of the second movable plate 140 regardless of the tilt angle of the second movable plate 140, and thereby, the attractive force in the area A1 is securely generated. Therefore, according to the input device 100 according to the one embodiment, the restoring force of the first movable plate 130 and the second movable plate 140 can be securely obtained when a pressing operation on the operation portion 132 of the first movable plate 130 is released, without providing a return mechanism such as a spring.

In addition, in the input device 100 according to the one embodiment, the attractive force in the area A1 gradually changes as the tilting of the second movable plate 140 changes; therefore, an abrupt change in the attractive force in the area A1 can be suppressed compared with a configuration in which the first movable plate 130 and the second movable plate 140 are pulled apart while remaining parallel to each other, and thus, a good operating feeling of the pressing operation on the operation portion 132 of the first movable plate 130 can be obtained.

In addition, in the input device 100 according to the one embodiment, the coil 165 is wound around the outer surfaces of the magnet 160; therefore, the magnetic force of the magnet 160 can be strengthened or weakened by adjusting the amount of current supplied to the coil 165, and thus, the magnetic attractive force between the first movable plate 130 and the second movable plate 140 can be adjusted. As a result, the input device 100 according to the one embodiment can strengthen or weaken the click feeling of a pressing operation on the operation portion 132 of the first movable plate 130.

In addition, the input device 100 according to the one embodiment uses a permanent magnet as the magnet 160; therefore, a magnetic attractive force can be generated between the first movable plate 130 and the second movable plate 140 even in a state where no current is supplied to the coil 165, and thus, a click feeling of a pressing operation on the operation portion 132 of the first movable plate 130 can be presented. Note that, in the case where it is not necessary to adjust the click feeling of a pressing operation, a constant magnetic attractive force may be applied between the first movable plate 130 and the second movable plate 140 by using a permanent magnet as the magnet 160 without using the coil 165.

In addition, the input device 100 according to the one embodiment uses the magnetic attractive force between the first movable plate 130 and the second movable plate 140 to generate a click feeling of a pressing operation on the operation portion 132 of the first movable plate 130, and thereby, can make wear and deterioration of the first movable plate 130 and the second movable plate 140 less likely to occur for generating the click feeling.

In addition, the input device 100 according to the one embodiment includes the first yoke 171 provided between the first movable plate 130 and the magnet 160, and the second yoke 172 provided between the second movable plate 140 and the magnet 160. Accordingly, the input device 100 according to the one embodiment can increase the magnetic attraction between the first movable plate 130 and the second movable plate 140.

In addition, in the input device 100 according to the one embodiment, the first movable plate 130 is connected to the one pole 161 of the magnet 160 at a terminal end, and is provided to be extending from the terminal end toward the other pole 162 side of the magnet 160; the second movable plate 140 is connected to the other pole 162 of the magnet 160 at a terminal end, and is provided to be extending from the terminal end toward the one pole 161 side of the magnet 160; and while the first movable plate 130 is not being operated, the portion on the free end 130A side of the first movable plate 130 and the portion on the free end 140B side of the second movable plate overlap each other. Accordingly, the input device 100 according to the one embodiment can have the first movable plate 130 and the second movable plate 140 arranged on a projection plane of the magnet 160, can efficiently use the installation space, and can realize downsizing of the entire input device 100.

Further, the input device 100 according to the one embodiment can be easily assembled by having the first yoke 171 and the second yoke 172, the base member 170 (the magnet 160, the coil 165, and the FPC 150), the second movable plate 140, and the first movable plate 130 arranged in a stack from the upper opening 110A of the housing 110 in the internal space 110B of the housing 110, and further attaching the frame 120 to the housing 110.

(Examples of Suitable Dimensions of First Gap D1 and Second Gap D2)

Figure 5:
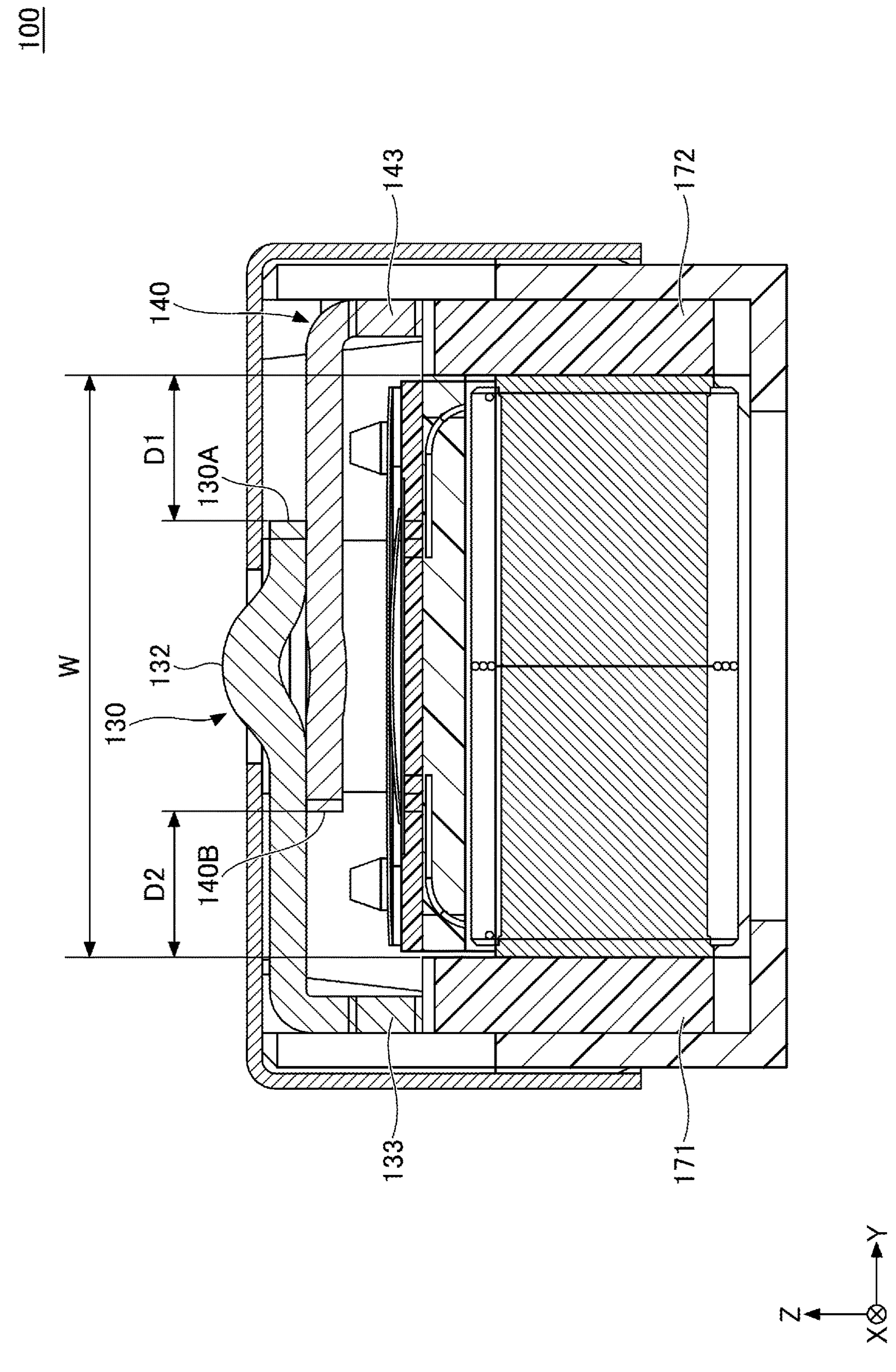
FIG. 5 is a diagram illustrating a first gap and a second gap of the input device according to the one embodiment.
Figure 6:
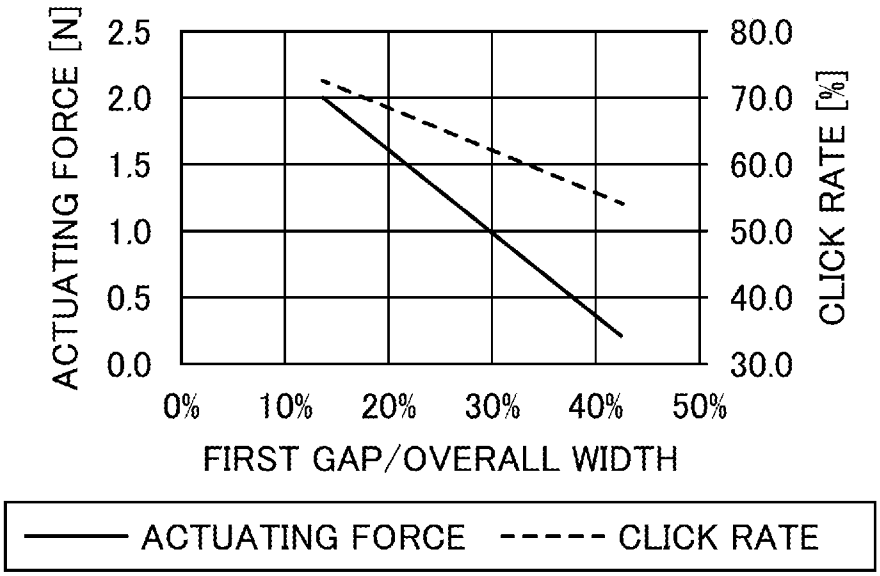
FIG. 6 is a graph illustrating a relationship among the first gap, the actuating force [N], and the click rate [%] in the input device according to the one embodiment.
Figure 7:
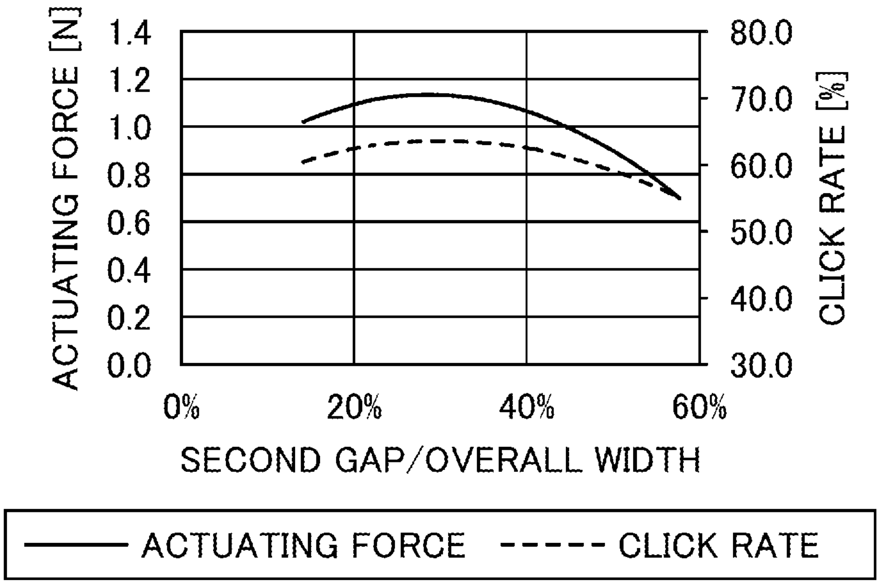
FIG. 7 is a graph illustrating a relationship among the second gap, the actuating force [N], and the click rate [%] in the input device according to the one embodiment.

FIG. 5 is a diagram illustrating a first gap D1 and a second gap D2 of the input device 100 according to the one embodiment. FIG. 6 is a graph illustrating a relationship among the first gap D1, the actuating force [N], and the click rate [%] in the input device 100 according to the one embodiment. FIG. 7 is a graph illustrating a relationship among the second gap D2, the actuating force [N], and the click rate [%] in the input device 100 according to the one embodiment. Here, the actuating force is a load required to switch the input device 100 from off to on (or from on to off), and the click rate is a rate that quantifies the feeling received (felt) by an operator when performing a pressing operation on the input device 100.

As illustrated in FIG. 5, the input device 100 according to the one embodiment includes the first gap D1 between the free end 130A of the first movable plate 130 and the terminal end of the second movable plate 140 on a plane where the first movable plate 130 and the second movable plate 140 overlap. Note that the terminal end of the second movable plate 140 is an end on the Y-axis positive side of the second movable plate 140, and is a portion where the leg portion 143 is provided as the fulcrum when tilting the second movable plate 140.

Accordingly, the input device 100 according to the one embodiment can cause the free end 130A of the first movable plate 130 to be appropriately separated from the terminal end of the second movable plate 140, and thereby, can tilt the second movable plate 140 with a good actuating force.

In addition, as illustrated in FIG. 5, the input device 100 according to the one embodiment includes the second gap D2 between the free end 140B of the first movable plate 130 and the terminal end of the second movable plate 140 on a plane where the second movable plate 140 and the first movable plate 130 overlap. Note that the terminal end of the first movable plate 130 is an end on the Y-axis negative side of the first movable plate 130, and is a portion where the leg portion 133 is provided as the fulcrum when tilting the first movable plate 130.

Accordingly, by having the free end 140B of the second movable plate 140 appropriately separated from the terminal end of the first movable plate 130, the input device 100 according to the one embodiment can cause the second movable plate 140 to receive an appropriate magnetic attractive force from the first movable plate 130, and thereby, can cause the second movable plate 140 to be tilted with a good actuating force.

Here, as illustrated in FIG. 5, the distance from the first yoke 171 to the second yoke 172 is defined as the overall width W.

In this case, as illustrated in FIG. 6, it is favorable that the ratio of the first gap D1 to the overall width W is 15 to 35%, and is more favorable to be 15 to 20%. Accordingly, the input device 100 according to the one embodiment can obtain a good actuating force [N] and a good click rate [%], and thus, can present a good operation feeling.

In addition, as illustrated in FIG. 7, it is favorable that the ratio of the second gap D2 to the overall width W is 20 to 40%. Accordingly, the input device 100 according to the one embodiment can obtain a good actuating force [N] and a good click rate [%], and thus, can present a good operation feeling.

Operation Load Characteristic of Input Device 100

Figure 8:
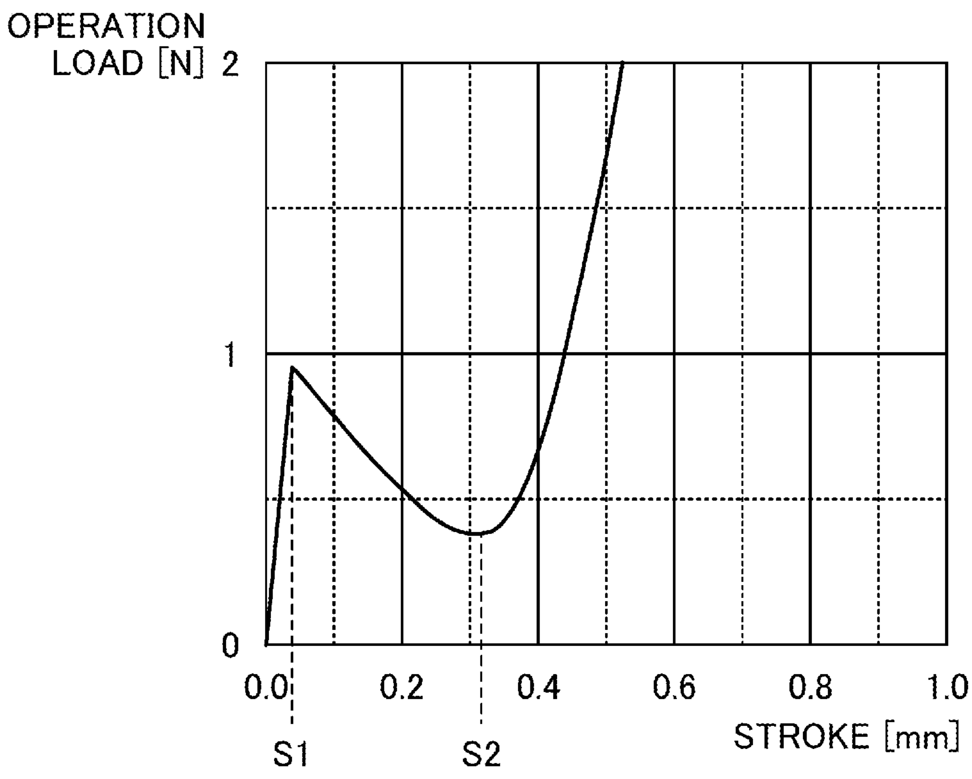
FIG. 8 is a graph illustrating an operation load characteristic of the input device according to the one embodiment.

FIG. 8 is a graph illustrating an operation load characteristic of the input device 100 according to the one embodiment. In the graph illustrated in FIG. 8, the vertical axis represents the operation load [N], and the horizontal axis represents the stroke [mm] of the pressing operation.

As illustrated in FIG. 8, the operation load [N] monotonically increases until the stroke [mm] of the pressing operation on the operation portion 132 of the first movable plate 130 becomes a predetermined amount S1.

Then, once the stroke [mm] of the pressing operation performed on the operation portion 132 of the first movable plate 130 exceeds the predetermined amount S1, the second movable plate 140 is pulled off from the first movable plate 130.

Therefore, as illustrated in FIG. 8, the operation load [N] decreases from the time when the stroke [mm] exceeds the predetermined amount S1 until reaching a predetermined amount S2 that brings the switch-on state.

In this way, the input device 100 according to the one embodiment can present a click feeling in response to a pressing operation on the operation portion 132 of the first movable plate 130 by changing the operation load [N] from increasing to decreasing when the stroke [mm] exceeds the predetermined amount S1.

Further, as illustrated in FIG. 8, even after the stroke [mm] reaches the predetermined amount S2 that causes switching to the switch-on state, the input device 100 according to the one embodiment can increase the stroke [mm] of the operation portion 132 while increasing the operation load [N] in response to an operation to further push the operation portion 132 of the first movable plate 130 (what-is-called an overstroke operation).

First Modified Example (Configuration of Input Device 100-2)

Figure 9:
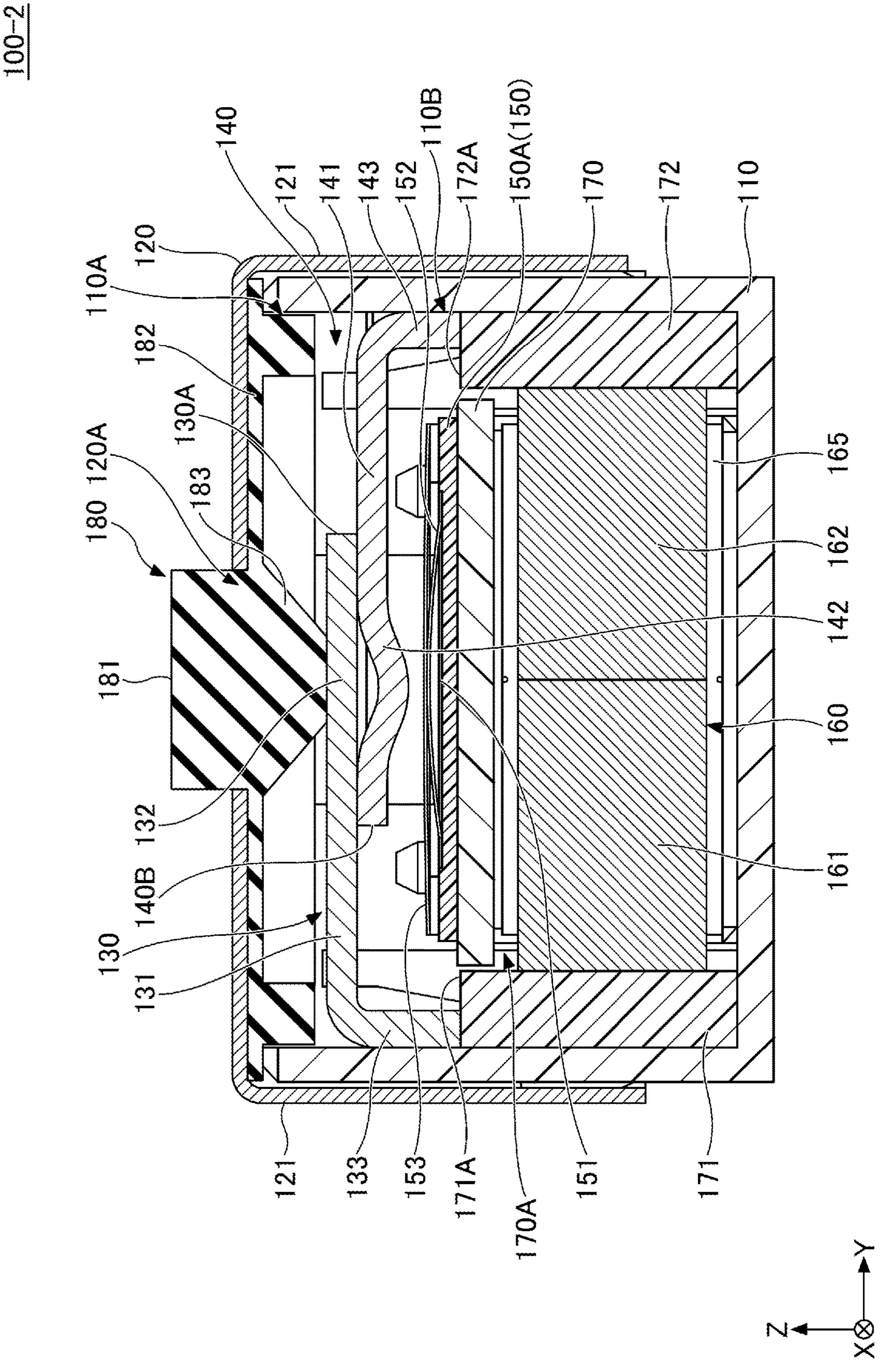
FIG. 9 is a cross-sectional view of the input device according to a first modified example of the one embodiment while not being operated.

FIG. 9 is a cross-sectional view of an input device 100-2 according to a first modified example of the one embodiment while not being operated. In the following, changes from the input device 100 will be described with respect to the input device 100-2. Note that, in the input device 100-2, elements common to the input device 100 are assigned the same reference numerals as in the input device 100, and the descriptions are omitted here.

As illustrated in FIG. 9, the input device 100-2 further includes a stem 180 at the upper opening 110A of the housing 110 and on the upper side (the Z-axis positive side) of the first movable plate 130, has an operation portion 181 of the stem 180 exposed from the opening 120A of the frame 120, and in these regards, differs from the input device 100.

The stem 180 is an example of an "operation member". The stem 180 is formed by using an elastic material (e.g., rubber, silicon, etc.). The stem 180 includes the operation portion 181 projecting upward in a center portion. The operation portion 181 is supported by a relatively thin flat flange portion 182 provided around the operation portion 181. The operation portion 181 is provided to be movable in the up-down direction (the Z-axis direction) by elastic deformation of the flange portion 182.

In addition, the stem 180 includes a pressing portion 183 below the operation portion 181, that projects downward (in the Z-axis negative direction) more than the flange portion 182. The pressing portion 183 is provided above the operation portion 132 of the first movable plate 130. The pressing portion 183 is a portion that presses the operation portion 132 of the first movable plate 130 while the operation portion 181 of the stem 180 is being operated.

Note that, as illustrated in FIG. 9, in the input device 100-2, the operation portion 132 of the first movable plate 130 is changed to the portion having a planar shape.

(Operations of Input Device 100-2)

Figure 10:
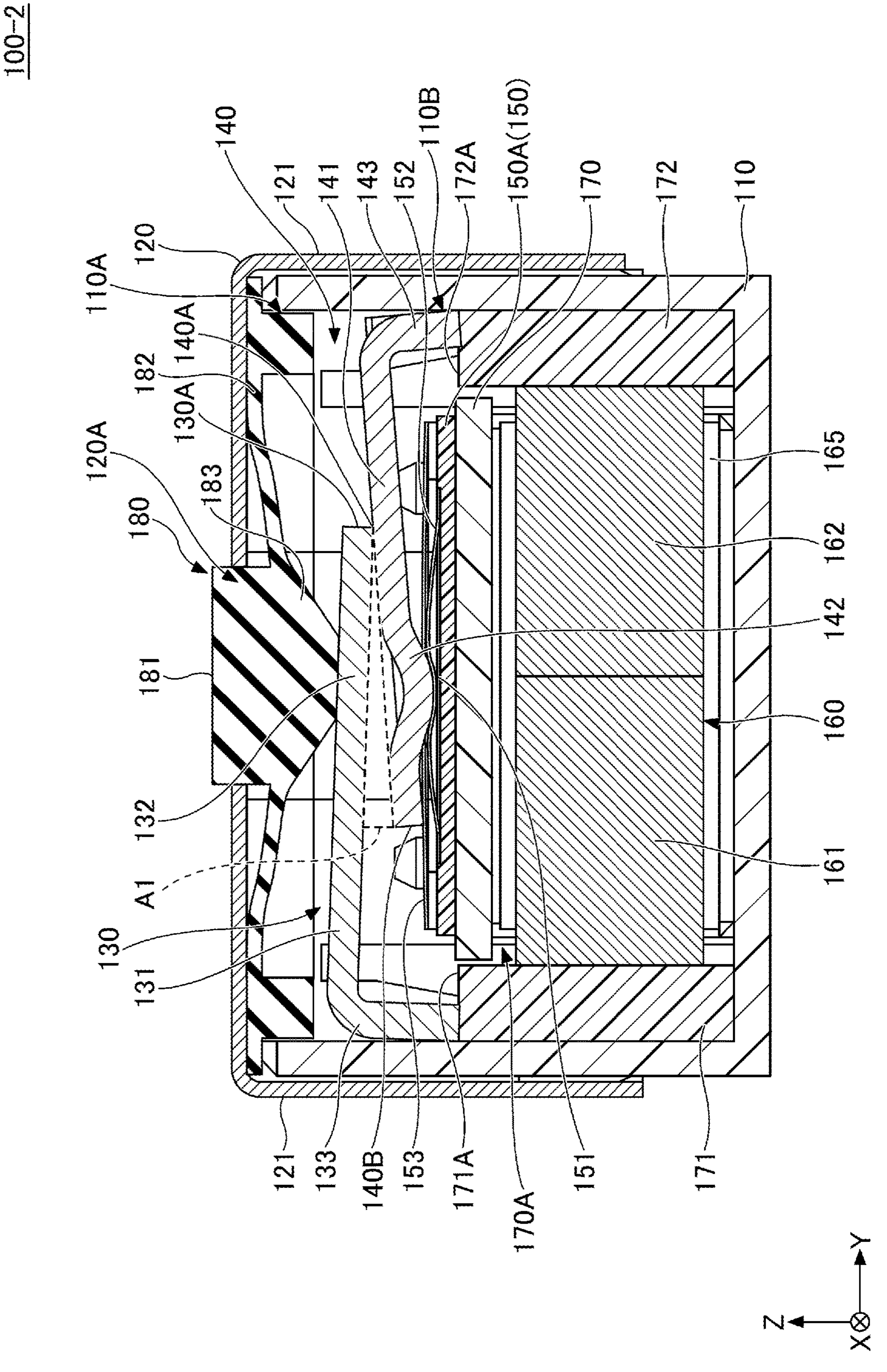
FIG. 10 is a cross-sectional view of the input device according to the first modified example of the one embodiment while being operated.

Next, with reference to FIGS. 9 and 10, operations of the input device 100-2 will be described. FIG. 10 is a cross-sectional view of the input device 100-2 according to the first modified example of the one embodiment while being operated.

As illustrated in FIG. 9, in the input device 100-2 according to the first modified example, when no pressing operation is performed on the operation portion 181 of the stem 180, both the first movable plate 130 and the second movable plate 140 are in a horizontal state. At this time, the pressing portion 142 of the second movable plate 140 is separated from the movable contact member 152 provided in the base portion 150A of the FPC 150, i.e., is not pressing the movable contact member 152. Therefore, the movable contact member 152 is not connected to the fixed contact 151 provided in the base portion 150A of the FPC 150, and hence, the input device 100-2 is in the switch-off state.

Then, as illustrated in FIG. 10, in the input device 100-2 according to the first modified example, when a pressing operation is performed by an operator on the operation portion 181 of the stem 180, while the flange portion 182 of the stem 180 elastically deforms, the operation portion 181 and the pressing portion 183 of the stem 180 move downward. At this time, by the pressing portion 183 of the stem 180 pressing the operation portion 132 of the first movable plate 130, the first movable plate 130 tilts downward to the right.

Then, the free end 130A of the first movable plate 130 pushes down the middle portion 140A of the second movable plate 140. Accordingly, the second movable plate 140 tilts downward to the left so as to make the free end 140B separated from the first movable plate 130 while the middle portion 140A remains in contact with the first movable plate 130.

As a result, the pressing portion 142 of the second movable plate 140 presses the top portion of the movable contact member 152. Then, the movable contact member 152 elastically deforms, and a portion on the reverse side of the top portion of the movable contact member 152 is connected to the fixed contact 151. Thus, the input device 100-2 switches to the switch-on state.

The input device 100-2 according to the first modified example has substantially the same configuration as the input device 100 except for the changes from the input device 100 described above, and hence, can exhibit the same effects as the input device 100. In addition, by having further provided the stem 180, in the input device 100-2 according to the first modified example, part of the operation load of the pressing operation can be absorbed by the elastic deformation of the stem 180 while the pressing operation is being performed on the operation portion 181 of the stem 180. Therefore, compared with the input device 100, the change in the operation load upon a pressing operation can be moderated in the input device 100-2 according to the first modified example.

In addition, by adjusting the elastic modulus (in other words, the difficulty of elastic deformation) of the material of the stem 180, the input device 100-2 according to the first modified example can adjust the degree of change in the operation load of a pressing operation.

Actuating Force Characteristic of Input Device 100-2

Figure 11A:
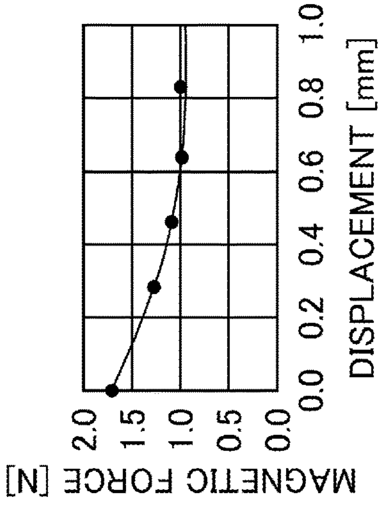
FIGS. 11A-11C are graphs illustrating characteristics related to an actuating force of the input device according to the first modified example of the one embodiment.
Figure 11B:
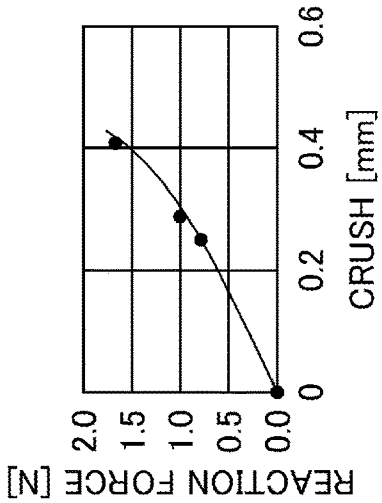
Figure 11C:
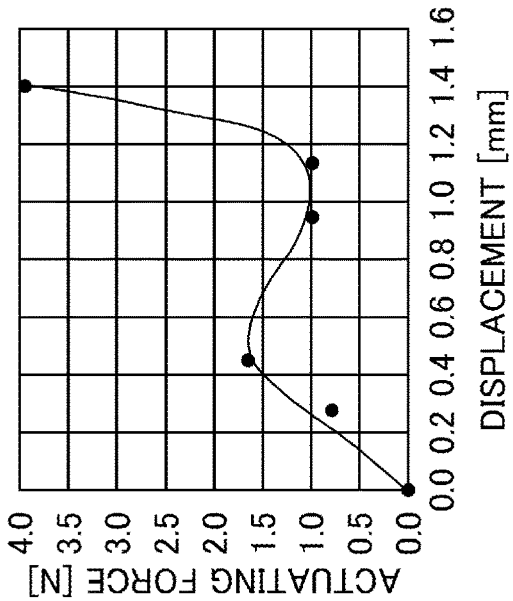

FIGS. 11A-11C are graphs illustrating characteristics related to an actuating force of the input device 100-2 according to the first modified example of the one embodiment.

FIG. 11A is a graph illustrating a relationship between the displacement [mm] of the operation portion 181 of the stem 180 and the magnetic force [N] by the magnet 160.

FIG. 11B is a graph illustrating a relationship between the crush [mm] of the operation portion 181 of the stem 180 and the reaction force [N] by the stem 180.

FIG. 11C is a graph illustrating a relationship between the displacement [mm] of the operation portion 181 of the stem 180 and the actuating force [N].

As illustrated in FIGS. 11A-11C, in the input device 100-2 according to the first modified example, by further providing the stem 180, the actuating force characteristic of the operation portion 181 of the stem 180 illustrated in FIG. 11C is the sum of the magnetic force characteristic by the magnet 160 illustrated in FIG. 11A and the reaction force characteristic by the stem 180 illustrated in FIG. 11B.

Accordingly, the input device 100-2 according to the first modified example can make the actuating force characteristic of the operation portion 181 of the stem 180 illustrated in FIG. 11C moderate in the change in the operation load of a pressing operation, as compared with the operation load characteristic of the input device 100 illustrated in FIG. 8.

Second Modified Example (Configuration of Input Device 100-3)

Figure 12:
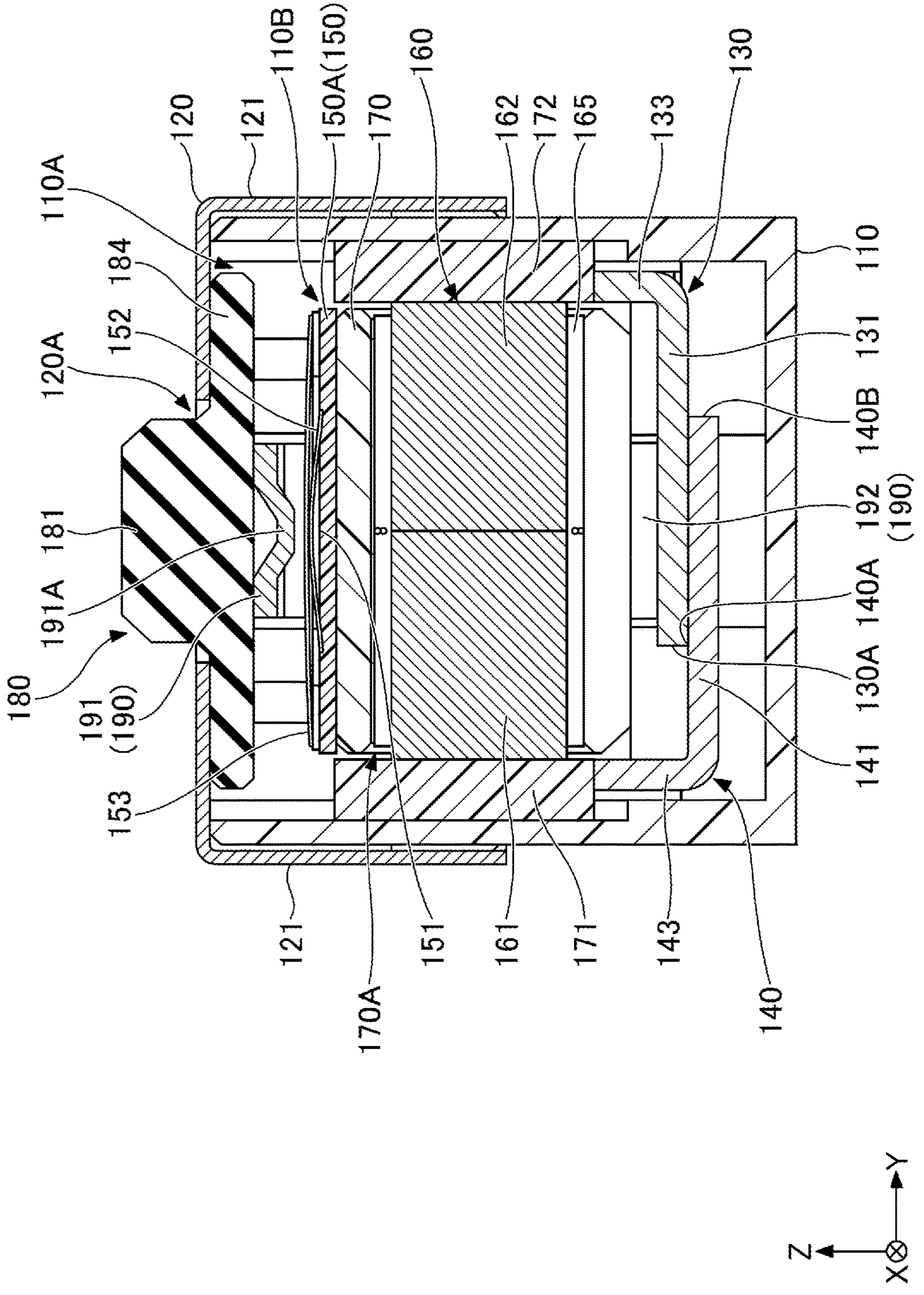
FIG. 12 is a cross-sectional view of the input device according to a second modified example of the one embodiment while not being operated.
Figure 13:
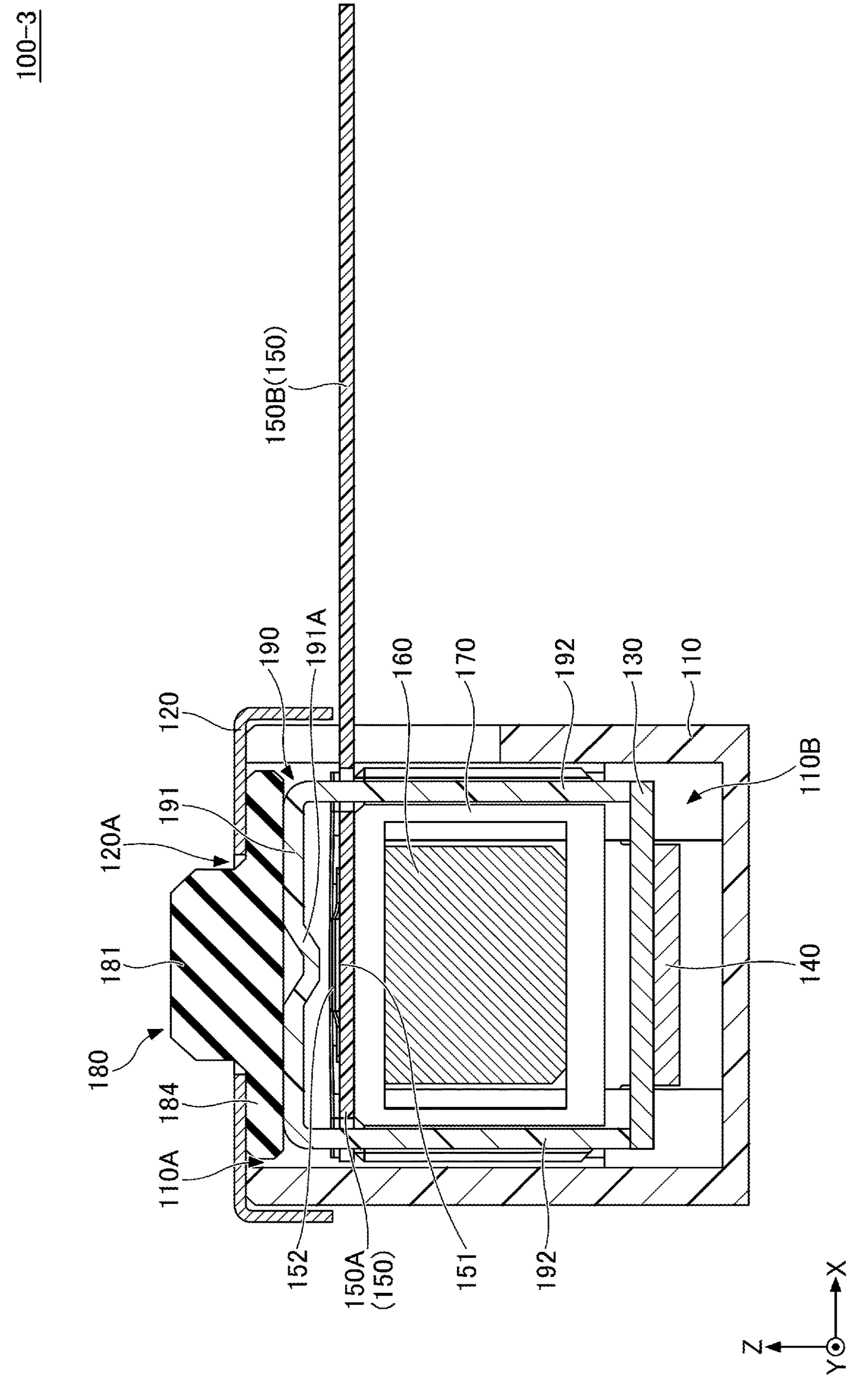
FIG. 13 is a cross-sectional view of the input device according to the second modified example of the one embodiment while not being operated.

FIGS. 12 and 13 are cross-sectional views of an input device 100-3 according to a second modified example of the one embodiment while not being operated. FIG. 12 is a cross-sectional view of the input device 100-3 in the YZ plane. FIG. 13 is a cross-sectional view of the input device 100-3 in the XZ plane.

In the following, changes from the input device 100 will be described with respect to the input device 100-3. Note that, in the input device 100-3, elements common to the input device 100 are assigned the same reference numerals as in the input device 100, and the descriptions are omitted here.

As illustrated in FIGS. 12 and 13, the input device 100-3 is provided with the first movable plate 130 and the second movable plate 140 under the first yoke 171, the second yoke 172, and the base member 170 (the magnet 160, the coil 165, and the FPC 150) in the internal space 110B of the housing 110, and in these regards, differs from the input device 100.

In addition, as illustrated in FIGS. 12 and 13, the input device 100-3 is provided with the first movable plate 130 and the second movable plate 140 on the opposite side in the up-down direction (the Z-axis direction) in the internal space 110B of the housing 110, and also in this regard, differs from the input device 100.

In addition, as illustrated in FIGS. 12 and 13, the input device 100-3 is provided with the first movable plate 130 and the second movable plate 140 that are exchanged with each other in the left-right direction (in the Y-axis direction) in the internal space 110B of the housing 110, and also in this regard, differs from the input device 100.

Therefore, in the input device 100-3, the leg portion 133 of the first movable plate 130 is provided so as to be extending upward (in the Z-axis positive direction) from the terminal end (the Y-axis positive side end) of the base portion 131, and supports the terminal end of the base portion 131 so as to cause the base portion 131 to take a horizontal position, by having the upper surface contact the bottom surface of the second yoke 172.

Similarly, in the input device 100-3, the leg portion 143 of the second movable plate 140 is provided so as to be extending upward (in the Z-axis positive direction) from the terminal end (an end on the Y-axis negative side) of the base portion 141, and supports the terminal end of the base portion 141 so as to cause the base portion 141 to take a horizontal position, by having the upper surface contact the bottom surface of the first yoke 171.

Note that, as illustrated in FIGS. 12 and 13, in the input device 100-3, the portion of the base portion 131 of the first movable plate 130 on the free end 130A side is changed to the portion having a planar shape. In addition, in the input device 100-3, the portion of the base portion 141 of the second movable plate 140 on the free end 140B side is changed to the portion having a planar shape.

In addition, the input device 100-3 further includes the stem 180 at the upper opening 110A of the housing 110 and on the upper side (positive side of the Z-axis) of a top plate portion 191 of an intervening member 190, has the operation portion 181 of the stem 180 exposed from the opening 120A of the frame 120, and in these regards, differs from the input device 100.

The stem 180 is an example of an "operation member". The stem 180 is formed by using a relatively rigid material (e.g., resin, metal, and the like). The stem 180 includes a horizontal flat plate-shaped base portion 184 and an operation portion 181 projecting upward from a center portion of the base portion 184. The operation portion 181 is provided to be movable in the up-down direction (the Z-axis direction) in the opening 120A of the frame 120. The base portion 184 is provided to be movable in the up-down direction (the Z-axis direction) in the internal space 110B of the housing 110.

In addition, the input device 100-3 further includes the intervening member 190 in the internal space 110B of the housing 110, and in this regard, differs from the input device 100. The intervening member 190 is interveningly provided between the stem 180 and the first movable plate 130, and when a pressing operation is performed on the stem 180, moves downward (in the Z-axis negative direction) in conjunction with the stem 180, to press the first movable plate 130.

The intervening member 190 includes the horizontal flat plate-shaped top plate portion 191 and a pair of wall portions 192 arranged to hang downward (in the Z-axis negative direction) from both ends in the front-back direction (the X-axis direction) of the top plate portion 191.

The top plate portion 191 is provided on the lower side of the stem 180. The upper surface of the top plate portion 191 is in contact with the bottom surface of the stem 180. Accordingly, the intervening member 190 is configured to be movable downward (in the Z-axis negative direction) in conjunction with the stem 180, when a pressing operation is performed on the stem 180.

The top plate portion 191 includes a pressing portion 191A projecting downward (in the Z-axis negative direction) in its center portion. The pressing portion 191A is provided above the top portion of the movable contact member 152. The pressing portion 191A is a portion that presses the top portion of the movable contact member 152 while a pressing operation is performed on the operation portion 181 of the stem 180.

Each of the pair of wall portions 192 has a vertical wall shape, and is provided to be opposite to each other in guide grooves formed on the side walls (both sides in the X-axis positive direction and in the X-axis negative direction) of the base member 170 interposed; the intervening member 190 is held to be ascendible and descendible in the up-down direction (the Z-axis direction) with respect to the base member 170. Then, each of the pair of wall portions 192 extends downward (in the Z-axis negative direction) until coming into contact with a portion on the free end 130A side of the first movable plate 130. Accordingly, each of the pair of wall portions 192 can press the portion on the free end 130A side of the first movable plate 130, when a pressing operation is performed on the stem 180 to move the intervening member 190 downward (in the Z-axis negative direction).

(Operations of Input Device 100-3)

Figure 14:
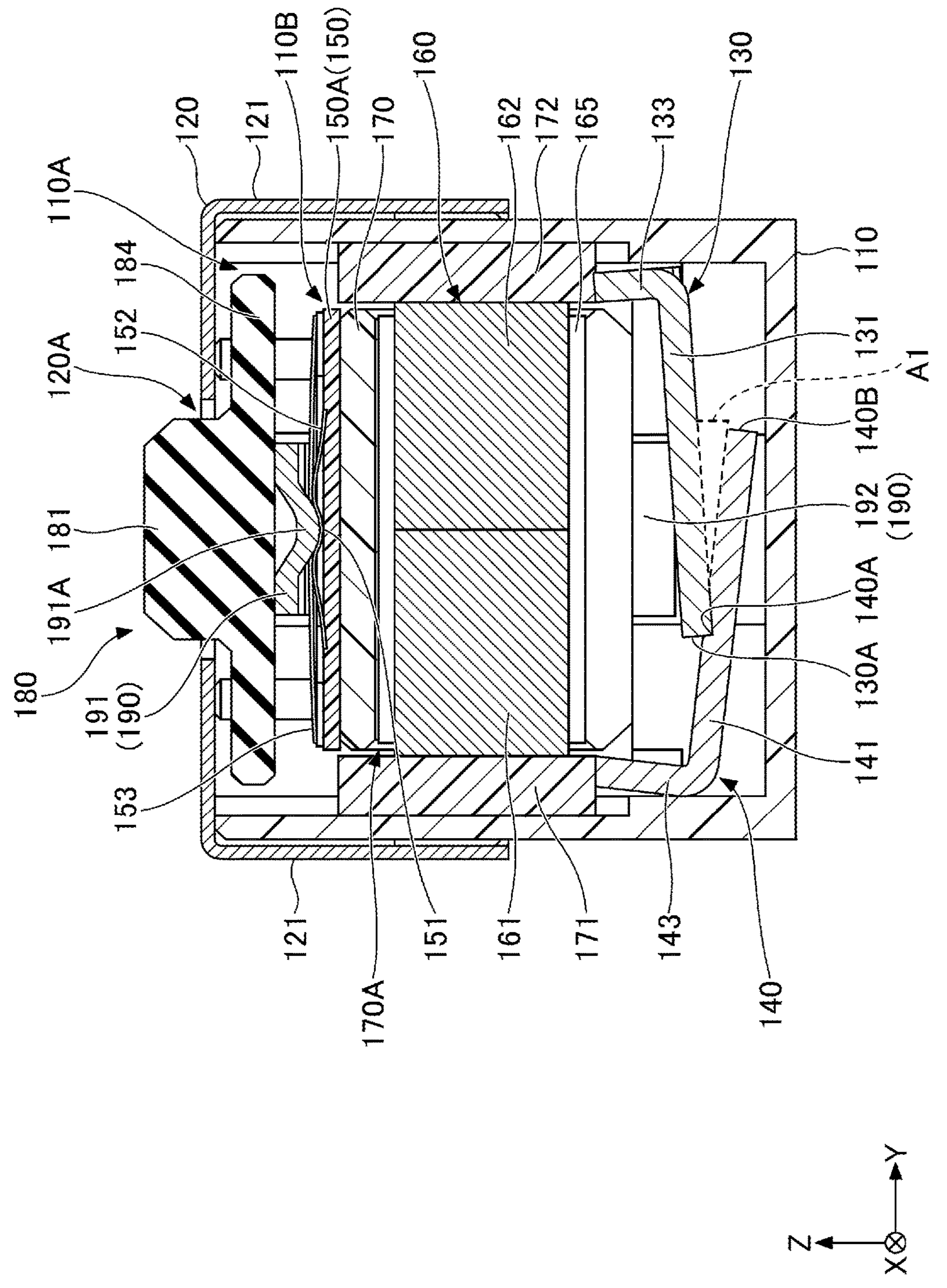
FIG. 14 is a cross-sectional view of the input device according to the second modified example of the one embodiment while being operated.

Next, with reference to FIGS. 12 to 14, operations of the input device 100-3 will be described. FIG. 14 is a cross-sectional view of the input device 100-3 according to the second modified example of the one embodiment while being operated.

As illustrated in FIGS. 12 and 13, in the input device 100-3 according to the second modified example, when no pressing operation is performed on the operation portion 181 of the stem 180, both the first movable plate 130 and the second movable plate 140 are in a horizontal state. At this time, a portion on the free end 130A side of the first movable plate 130 and a portion on the free end 140B side of the second movable plate 140 overlap each other. In addition, at this time, the pressing portion 191A provided on the top plate portion 191 of the intervening member 190 is separated from the movable contact member 152 provided in the base portion 150A of the FPC 150, i.e., is not pressing the movable contact member 152. Therefore, the movable contact member 152 is not connected to the fixed contact 151 provided in the base portion 150A of the FPC 150, and hence, the input device 100-3 is in the switch-off state.

Then, as illustrated in FIG. 14, in the input device 100-3 according to the second modified example, when a pressing operation is performed by an operator on the operation portion 181 of the stem 180, the intervening member 190 moves downward (in the Z-axis negative direction) in conjunction with the stem 180.

At this time, by the pair of wall portions 192 of the intervening member 190 pressing a portion on the free end 130A side of the first movable plate 130, the first movable plate 130 tilts downward to the left.

Then, the free end 130A of the first movable plate 130 pushes down the middle portion 140A of the second movable plate 140. Accordingly, the second movable plate 140 tilts downward to the right so as to make the free end 140B separated from the first movable plate 130 while the middle portion 140A remains in contact with the first movable plate 130.

In addition, as the intervening member 190 moves downward (in the Z-axis negative direction), the pressing portion 191A provided in the top plate portion 191 of the intervening member 190 presses the top portion of the movable contact member 152. Then, the movable contact member 152 elastically deforms, and a portion on the reverse side of the top portion of the movable contact member 152 is connected to the fixed contact 151. Thus, the input device 100-3 switches to the switch-on state.

The input device 100-3 according to the second modified example has substantially the same configuration as the input device 100 except for the changes from the input device 100 described above, and hence, can exhibit the same effects as the input device 100. In addition, by having adopted a configuration in which the top portion of the movable contact member 152 is directly pressed (i.e., without intervention of the first movable plate 130 and the second movable plate 140) by the intervening member 190, the input device 100-3 according to the second modified example can press the top portion of the movable contact member 152 with high accuracy without being affected by variations in the component accuracy of the first movable plate 130 and the second movable plate 140.

Note that, as the input device 100-3 presses the first movable plate 130 without intervention of an elastic member in substantially the same way as the input device 100, the operation load characteristic of the input device 100-3 is substantially the same as that of the input device 100 illustrated in FIG. 8.

As above, embodiments according to the present inventive concept have been described in detail; note that the present inventive concept is not limited to these embodiments, and various changes and modifications can be made within the scope of the present inventive concept as set forth in the claims.

What is claimed is:

1. An operation mechanism comprising:

a magnet;

a first movable plate formed of a magnetic material and connected to one pole of the magnet;

a second movable plate formed of a magnetic material and connected to another pole of the magnet;

a first yoke provided between the first movable plate and the one pole of the magnet; and a second yoke provided between the second movable plate and the another pole of the magnet, wherein, while the first movable plate is not being operated, the second movable plate is at a return position that overlaps the first movable plate, and wherein, while the first movable plate is being operated, the first movable plate pushes down a middle portion of the second movable plate, such that the middle portion of the second movable plate remains in contact with the first movable plate and the second movable plate is tilted, so as to cause a free end of the second movable plate to be separated from the first movable plate.

2. The operation mechanism as claimed in claim 1, wherein each of the first movable plate and the second movable plate is provided to be tiltable with a terminal end as a fulcrum, and wherein a free end of the first movable plate overlaps the middle portion of the second movable plate to be always contactable.

3. The operation mechanism as claimed in claim 1, wherein the first movable plate is connected to the one pole of the magnet at a terminal end, and is provided to be extending from the terminal end toward the another pole side of the magnet, and the second movable plate is connected to the another pole of the magnet at a terminal end, and is provided to be extending from the terminal end toward the one pole side of the magnet, and a portion on the free end side of the first movable plate and a portion on the free end side of the second movable plate overlap each other while the first movable plate is not being operated.

4. The operation mechanism as claimed in claim 1, further comprising:

an operation member formed using an elastic material and configured to operate the first movable plate in response to a pressing operation performed by an operator.

5. The operation mechanism as claimed in claim 1, further comprising:

an operation member on which a pressing operation is performed by an operator; and an intervening member interveningly provided between the operation member and the first movable plate, and configured to operate the first movable plate by moving in conjunction with the operation member.

6. An input device comprising:

the operation mechanism as claimed in claim 1; and an input mechanism that can be switched by tilting the second movable plate.

* * * * *